INVENTORS
JOHN GRANT
MARTIN J. FISHER

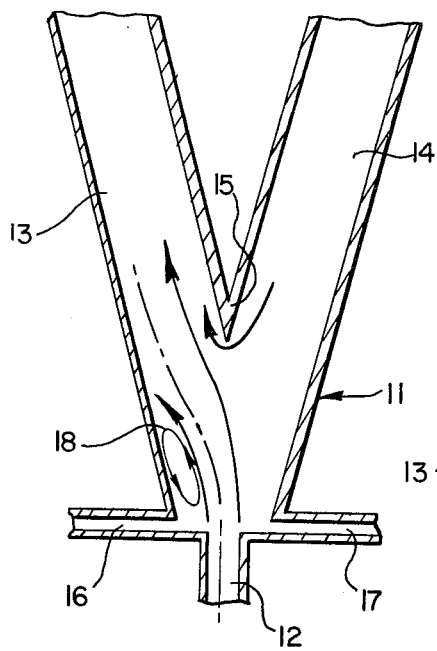
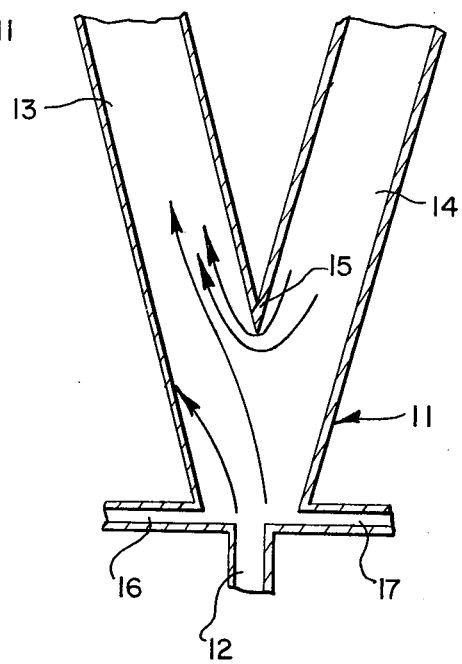
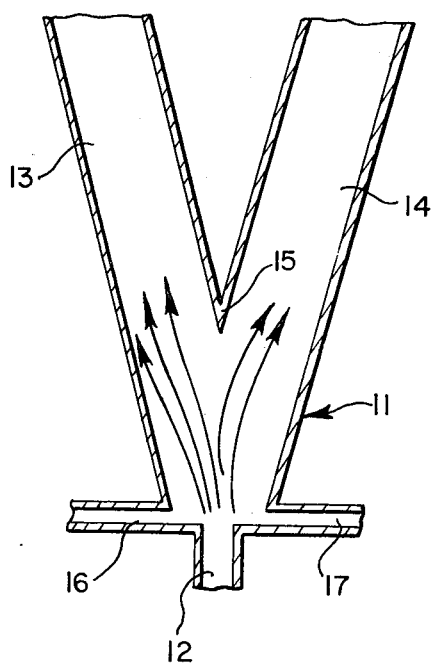

ATTORNEYS

INVENTORS
JOHN GRANT
MARTIN J. FISHER

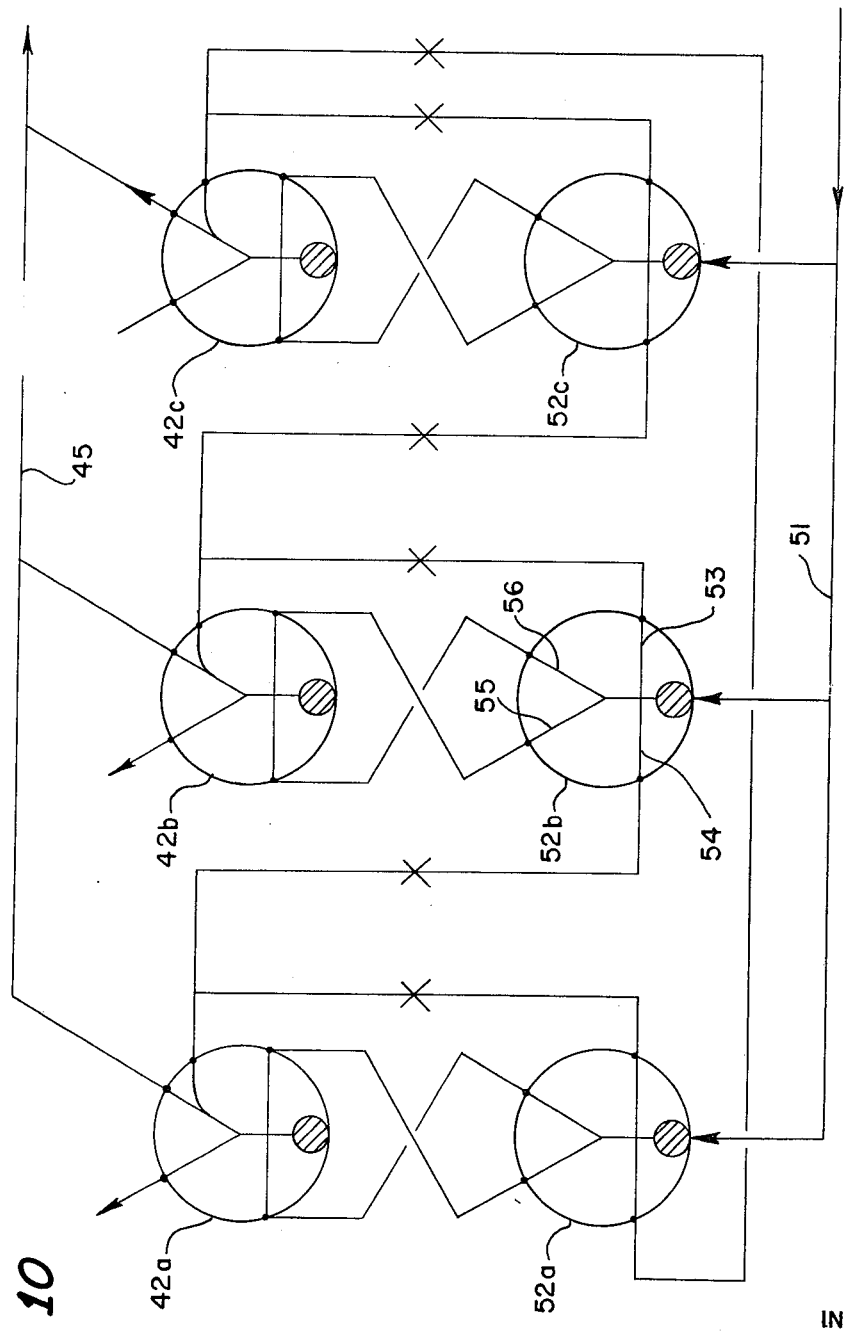

United States Patent Office 3,806,408
Patented Apr. 23, 1974

3,806,408
FLUID FLOW ARRANGEMENT FOR MEASURING A FLUID PROPERTY
John Grant, Risley, Warrington, and Martin John Fisher, Cranfield, Bedford, England, assignors to United Kingdom Atomic Energy Authority, London, England
Original application Dec. 14, 1967, Ser. No. 690,464, now Patent No. 3,661,163. Divided and this application July 2, 1970, Ser. No. 52,068
Int. Cl. F15c *1/14;* G21c *17/02*
U.S. Cl. 176—19 R                       5 Claims

ABSTRACT OF THE DISCLOSURE

A chain of flow distributors are coupled together so that changes in input to one device causes that device, and other devices in the chain, to modify their outputs. Various chains are described made up of monostable and multistable output devices. The fluid outputs are linked in common manifolds for measuring an intrinsic property of the fluid.

---

This application is a division of application Ser. No. 690,464 in the name of Grant et al., filed Dec. 14, 1967, now Pat. 3,661,163.

BACKGROUND OF THE INVENTION

This invention relates to flow distributors. More particularly it utilizes fluid logic (or fluidic) devices which provide specific output signals in response to an input signal. In fluidic devices the kinetic energy of a fluid flow is utilized to perform various logic functions similar to those for example, of switches, rectifiers and amplifiers known in the electrical and electronic art. Electronic components often include essential items fabricated from materials which limit the type of environment in which they ran be operated. Fluidic devices by contrast do not require such materials and consequently can be used in conditions where the use of electronic devices would not be feasible.

SUMMARY OF THE INVENTION

According to one aspect of the present invention a flow distributor cimprises a series of fluid switch devices each having at least one stable condition and each adapted to receive a respective input flow, coupling paths connecting the devices into a chain, and two common output regions to one or other of which the input flows are routed through the device according to the conditions of the device, the coupling paths being arranged to divert from each device to the next in the chain, a diversionary flow which tends to propagate from the one device to the next the condition prevailing in the former.

If the switch devices are of a monostable variety, the diversionary flow may be used to sustain an unstable condition in the following device and in this case it becomes possible for all the devices in the chain to be maintained in the unstable condition routing the input flows to the output region which corresponds to this condition. However, this situation relies on all input flows being maintained and should one or more suffer substantial reduction the switches will all revert to the stable condition and so route the input flows to the other output region.

If the switches are of a bistable variety, it may be arranged that the diversionary flow causes adoption of the condition in the previous device only when assisted or boosted by a control flow which is added at will or intermittently on an automatic basis, conveniently to all coupling paths simultaneously. In this way, the coupling paths are adapted to serve an AND function and thereby it becomes possible to step a given switch device condition down the chain to route the input flows singly and in turn to one of the output regions.

The switching one at a time to a single transmission route may be used for multiplexing fluid flows and so reduce system complexity after the multiplexing stage.

Severe instrumentation design problems arise in the nuclear reactor field where a multiplicity of leads from monitoring or control elements within a reactor pressure vessel have to pass to appropriate control points outside the vessel. To provide access for the leads the pressure vessel must be penetrated by large or numerous holes. At the present time a multiplexing stage is often performed on signals, after they have passed outside the pressure vessel, by electromechanical switching and the expense and inconvenience of large penetrations in the vessel for lears are accepted. Savings could be made if the multiplexing operation could be performed inside the pressure vessel since (to consider only a single benefit) fewer penetrations would be required in the vessel for the reduced numbers of outlet leads. Whereas the temperature and radiation levels associated with present day power reactors are generally too high for electronic components to be used effectively within the vessel and electromechanical devices, such as motor driven switches, may not have an acceptable reliability, the materials and construction of fluid switch devices can readily be made to withstand such severe conditions.

According to another aspect of the present invention a flow distributor is based on a hierarchial array of fluid switch devices. In this array a series of multi-output fluid switch devices constituting a first stage have like outputs connected to a common output region through a second stage constituted by at least one further multi-output fluid switch device, at least two of the like first stage outputs being connected in parallel to a respective second stage device input and only one of the outputs of such a second stage device being arranged for routing to the common output region. In the second stage, leakage represented by switching inefficiency may be diverted away from the route to the common output region. Further stages may be added to increase this effect and so reduce dilution at the output region by unwanted flow components.

DESCRIPTION OF THE DRAWINGS

Various further aspects of the invention will now be discussed with reference to the accompanying drawings, in which:

FIGS. 1, 2 and 3 are diagrammatic views showing one particular form of fluid switch device under various fluid flow conditions,

FIG. 10 is a diagrammatic view showing another example of a flow distributor.

DESCRIPTION OF THE PREFERRED EMBODIMENTS

Figure 4:
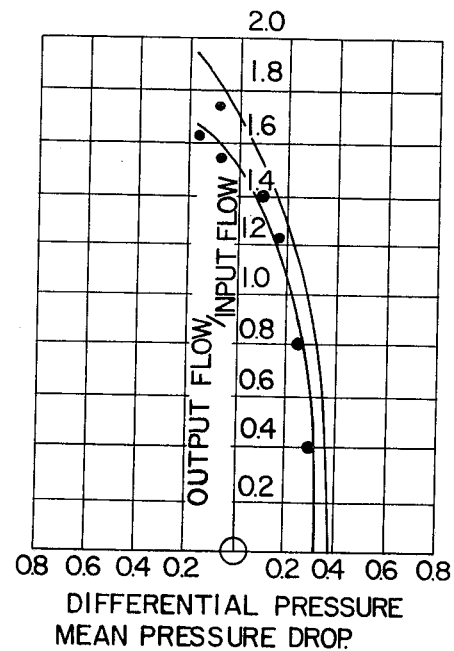
FIG. 4 is a graph.

In FIGS. 1 to 3 a switch 11 of the bistable Coanda type has an input nozzle 12 and fluid flow output channels 13, 14 dividing from a splitter 15. Control nozzles 16, 17 are disposed on opposite sides of the input nozzle 12. When a jet of fluid at low velocity issues from the input nozzle 12 it divides at the splitter 15 to flow equally down the two output channels 13, 14. When the jet velocity is increased so that a critical Reynolds number is exceeded the flow pattern becomes unstable and the jet tends to move away from a central position and attaches itself (after the manner described in the so-called Coanda effect) to one or other of the walls to flow out through one output channel 13 as shown in FIG. 1. The jet is held against the wall by a zone low pressure fluid known as a reattachment bubble 18. By injecting fluid through the control nozzle 16 into the region of the bubble 18, the pressure in this region may be raised causing the jet to switch from flowing down output channel 13 to flowing down output channel 14. The mass flow through output channel 13 may be higher than the input flow (as in FIG. 2) due to induction from output channel 14. Alternatively the mass flow through output channel 13 may be lower than the input flow (as in FIG. 3) since fluid spills over into the ostensibly unused output channel 14. Thus a fluid sample flowing through a given switch can be diluted and flows of a combination of switches could interact to provide spurious outputs.

FIG. 4 shows the relationship, for a switch similar to that of FIG. 1, between the differential pressure maintained between the output channels of the switch and the ratio of output flow/input flow. Generally it discloses that as the pressure differential falls induced flow increases from one outlet channel to the other. In order to reduce the induction and spill-over as previously referred to, the splitter 15, instead of being sharp, may be made concave towards the inlet nozzle 12 in order to promote the setting up of an eddy between the output channels.

Figure 5:
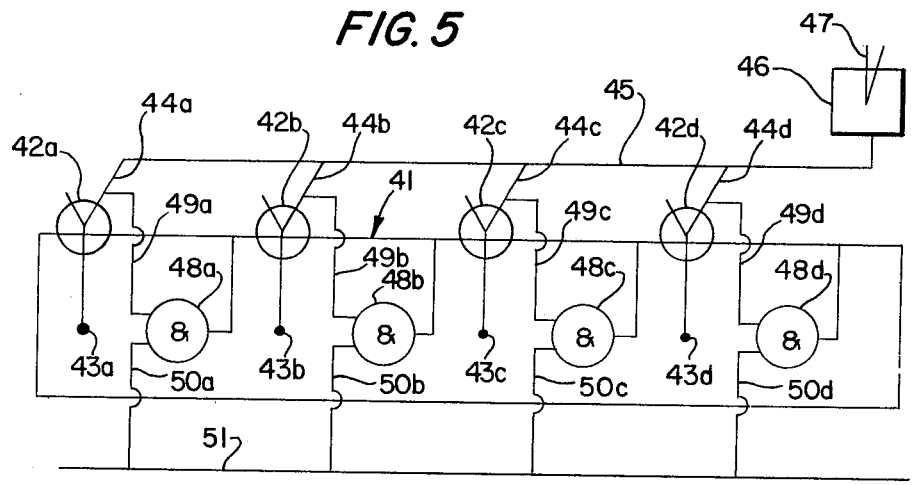
FIGS. 5 and 6 are diagrammatic views showing examples of flow distributors using chains of fluid switch devices.

FIG. 5 shows a flow distributor 41 using a chain of fluid switches (only four of which are shown) to enable a multiplexing method to be applied to a gas cooled reactor (not shown) for the measuring of coolant channel temperatures (each of which would normally be monitored by a separate thermocouple). The four illustrated switches 42a, 42b, 42c, 42d are similar to the switch described in connection with FIGS. 1, 2 and 3, preferably modified by the provision of concave shaped splitter described above. Input flows to the switches are supplied from reactor coolant channels 43a, 43b, 43c, 43d. The right hand output channel (respectively channels 44a–d) of each switch 42a–d is connected to a common sampling line 45 which leads to a common output region represented by a chamber 46 having in it a single thermocouple 47. Sampling is controlled by fluidic AND gates 48a–d.

The first input to each of the AND gates 48a–d is by way of link lines 49a–d, each extending respectively from the previous switch in the chain. The second input to each of the AND gates 48a–d is by way of control lines 50a–d each extending respectively from a common control line 51.

Operation of the distributor 41 is as follows with only the switch 42a in the sampling position and no fluid pulses being transmitted along the common control line 51, coolant from channel 43a passes through switch 42a and along output channel 44a to the sampling line 45 and so to the chamber 46 where the thermocouple 47 can be used to monitor the coolant temperature. If a pulse is now applied along common control line 51, the AND gate 48a will now receive an input along control line 50a in addition to the fluid bleed flow already existing along link line 49a from output channel 44a. The gate 48a will consequently provide an output fluid pulse which will act to switch the first switch 42a off and to switch the second switch 42b on. Thereafter coolant flow from the channel 43b will be fed to the chamber 46 for temperature monitoring in place of the previous flow from channel 43a. A further control pulse alone line 51 will trip the ring to sample channel 43c by way of switch 42c and so on until the sampling returns to channel 43a and switch 42a.

Although the distributor described above in connection with FIG. 5 is directed particularly to temperature measurement the thermocouple 47 could be replaced by an appropriate detector for any intrinsic property of the fluid flowing therethrough. In this context, by intrinsic property, is meant any property of the fluid flow which depends on the nature of the fluid rather than the amount of fluid present. Thus for a flow distributor for burst fuel cartridge detection the thermocouple 47 of the above embodiment could be replaced by a suitable radiation detector whereby the existence of fission products in the fluid flow could be detected.

Figure 6:
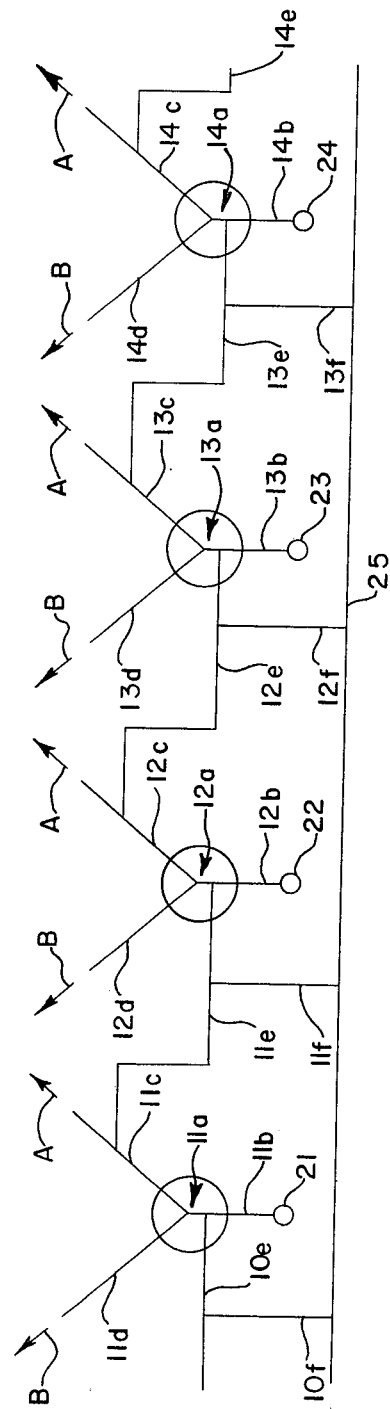

A variation on the fluidic multiplexer of FIG. 5 is a channel blockage detector shown in FIG. 6. To avoid high centre fuel temperatures, coolant is pumped through a reactor core (not shown) in fine, closely spaced channels, of which there may be several thousand. One limitation is that if a channel blocks, the consequent temperature and flow changes at the core outlet from that channel would be swamped by the effect of neighboring channels and a dangerous hot spot could be developed inside the channel by this blockage. The blockage detector changes the small scale effect of a single channel blockage into a large scale effect by using the energy from unblocked channels to generate a chain reaction, by which the blockage can be detected. To this end there is shown in FIG. 6 a flow distributor comprising a series of fluid switches (of which only switches 11a to 14a are shown) which by contrast with those previously described, are monostable; their input channels 11b to 14b are respectively fed by coolant gas from separate reactor coolant channels (not shown) by bleed lines 21 to 24. The four switches 11a to 14a are each provided with a first output channel, respectively 11c to 14c, and a second output channel, respectively 11d to 14d. Each first output channel 11c to 14c is branched to provide a switching control output to the next switch in the series by way of control lines 11e to 14e respectively. Each of control lines 10e to 13e is also coupled to a common reset line 25 by way of reset lines 10f to 13f respectively. All the first output channels 11c to 14c are orientated so that any fluid flow from them is to a first common output region (not shown) in the direction indicated by arrow A. All the second output channels 11d to 14d are orientated so that any fluid flow from them is to a second common output region (not shown) in the direction indicated by the arrow B. Suitable transducers (not shown) are provided so that a fluid flow in the direction of arrow A or B from the output channels is detectable. The switches 11a to 14a and the associated lines and channels are all situated within the pressure shell of the reactor.

In operation, with a normal flow of coolant in the reactor coolant channels, a bleed of the fluid coolant is fed, by way of bleed lines 21–24, to the switches 11a to 14a of the distributor. The stable position, to which each switch is biased (by utilizing the Coanda flow effect) is the one passing fluid along the second output channels 11d to 14d (that is to say in the direction indicated by arrow B). This stable position prevails if no control fluid flow is provided by way of control lines 10e to 14e. Such control flow is initially applied by passing a fluid pressure pulse along the common reset line 25. This causes flow in all the bleed lines 21–24 to be switched from the stable position along the second output channels 11d to 14d to the first output channels 11c to 14c. Thereafter a flow bleed from flow in each first output channel 11c to 14c acts, by way of control lines 11e to 14e, to maintain flow through the next switch in the chain in the non-stable position. Thus, for example, flow through the first output channel 12c of switch 12a helps maintain flow in the first output channel 13c of switch 13a. Thus, throughout the series of switches, fluid from the reactor is passing by way of, typically, bleed lines 21 to 24 into the fluid flow switches, and out by way of the first output channels 11c to 14c in the direction of arrow A to the first output region for eventual return to the reactor.

In the event of channel blockage occurring a chain reaction switching effect occurs throughout the chain in the following way. If blockage occurs in the reactor channel feeding bleed line 22, flow through switch 12a ceases. Thus the flow bleed from the first output channel 12c along line 12e is cut off and fluid flow through switch 13a, being biassed to do so, trips from the first output channel 13c to second output channel 13d. Thereafter the output of switch 14a trips in the same way and on around the chain until, finally, switch 11a trips. As the switches trip the fluid flowing out of the second output channels 11d to 14d of the switches is detected by the considerable increase of flow in the direction of the arrow B. If necessary, suitable indexing means can be utilized so that the original switch setting off the chain reaction can be determined by virtue of its position during the chain reaction. Thus in this example the switch concerned will be the one after the last in the chain to trip.

The distributor just described has a fail safe characteristic insofar as an energy supply has to be provided to maintain the apparatus in the "unblocked channel" indicating state and failure of that energy supply will cause the switches to trip as described above.

Although the device shown uses binary output fluid switches it would also be possible to utilize fluid amplifiers (such as vortex amplifiers) rather than switches whose (varying) output would be an analogue for a given (variable) input.

Figure 9:
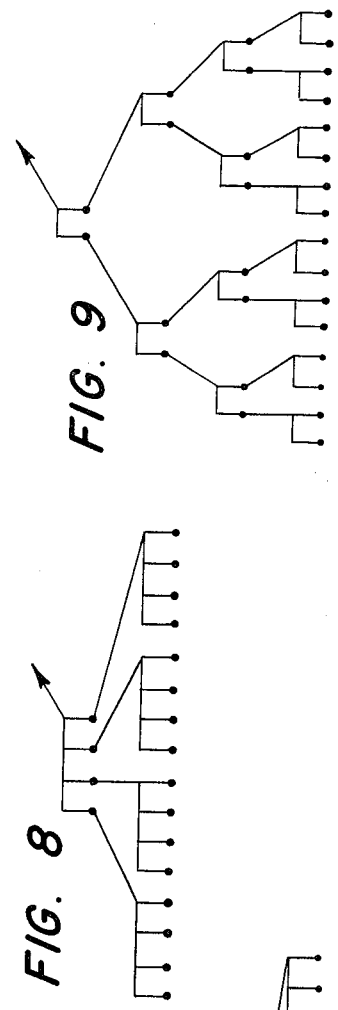
FIGS. 7, 8 and 9 are diagrammatic views showing examples of flow distributors using hierarchial arrays of fluid switch devices.
Figure 8:
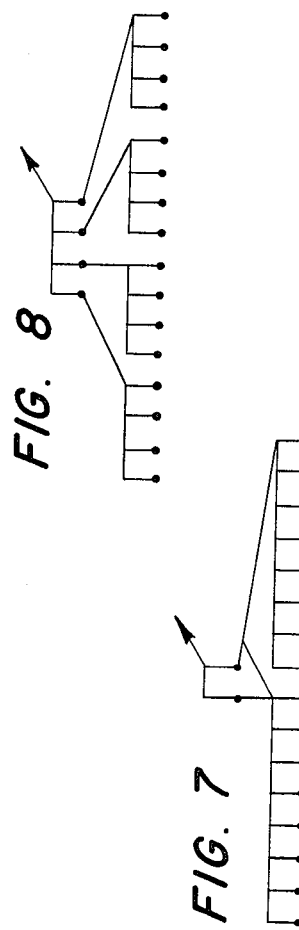
Figure 7:
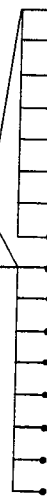

A hierarchial arrangement of fluid switches is shown in FIGS. 7–9. FIGS. 7 and 8 show a two stage system and FIG. 9 a four stage (binary tree) system. These systems are applicable to the sampling of nuclear reactor coolant channels for the detection of fuel element sheathing failures, commonly known as burst cartridge detection. The samples of channel coolant are subjected to an examination for symptoms of fission products and if they are found to be present a sheathing failure can be inferred. Multiplex sampling in accordance with FIG. 6 is assumed to be carried out on 72 channels. Because switching ratios are sensitive to the differential pressures across the Coanda switch, as shown in FIG. 4, 71 switches in the non-sampling condition would contribute a flow of $0.71x$ unit into the common sample line, where $x$ is the spill-over as a percentage of total input flow. A spill-over of 5% would therefore give a dilution of the sample by a factor of about 3.5 to 1. Dilution renders the detection of a single burst cartridge difficult in a large system since it increases the swamping effect provided by surrounding uncontaminated coolant.

Dilution for a given leakage can be reduced by dividing the 72 switches in the chain into groups and sampling the groups. For example the 72 may be divided into 12 groups each of 6 switches constituting a first stage. Each group has like switch outputs connected in parallel to a respective one of 12 switches constituting a second stage. These 12 switches are in turn divided into two groups of 6 switches similarly connected to two switches, constituting a third stage, two like outputs of this stage being taken to the fission product detector. Estimating the dilution at each stage gives $0.05x$ at stage 1, $0.10x$ at stage 2, and $.11x$ at stage 3, so for a 5% spill-over on each switch the final dilution would be 0.5 to 1. Dilution could be reduced further by using more stages. The staging in this case is chosen to allow a fast scanning facility. There are limits to this method of staging since after a certain number of stages, improvements can be had only at the cost of a large number of switches. For example if a ring of 16 switches is to be sampled and each has a leakage L, then all of the stagings shown in FIGS. 7, 8 and 9 may be used. The leakage and the cost in extra elements to attain this leakage are:

|  | Total leakage | Number of extra switches required |
| --- | --- | --- |
| Straight chain (no hierarchial arrangement) | 15L | 0 |
| Figure: |  |  |
| 7 | 8L | 2 |
| 8 | 6L | 4 |
| 9 | 4L | 7 |

It is seen that the leakage of the unstaged ring 15L, is approximately halved by the use of two extra switches (FIG. 7) but to halve it again requires 7 extra switches (FIG. 8), so there is a diminution in effectiveness as extra switches are added. In general for a ring of K elements the simplest staging is to add two extra switches reducing leakage from $(K-1)L$ to $KL/2$. The greatest reduction in a single stage is obtained by breaking the ring in R groups of R switches; the leakage is then $2(R-1)$ L at a cost of R extra switches. The limit of staging is the binary tree of FIG. 9 which gives leakage of $L(\log_2 K - 1)$, at a cost of $K - 2K(\frac{1}{2})^m$ switches, where $m = \log_2 K$. These formulae indicate the savings very roughly, since K and $\log_2 K$ are not always ordinal numbers. In practice the staging will also be chosen to take account of natural groupings of sampling points in the system, and for the open ended samples there will be limitations arising from the interconnection of control lines.

Although most of the examples in this specification have been concerned with the nuclear reactor field the techniques described are applicable to many signal transmission problems.

In the further arrangement of FIG. 10 the principle employed is that the direction of the output flow of each switch in the series is determined by a diversionary flow not only from the previous switch but also from itself. If the diversionary flow occurs in a particular switch condition, say the sampling condition, then the diversionary flows will be unequal at a switch in the non-sampling condition when it is preceded by one which is in the sampling condition. This inequality is used to direct a control flow in a condition-changing manner.

More specifically each of the switches 42a–c has an associated control switch 52a–c and the coupling paths for the diversionary flows are laid out as already generally described in the preceding paragraph to apply biasses on the control switches through their control nozzles. The biasses are chosen so that if, for example, switches 42a and 42b are both in the non-sampling condition (that is to say flow to left-hand output channel of switches 42a and 42b) then the flow to control nozzle 53 is greater than that to control nozzle 54 from the previous switch 42a such that if a flow pulse is applied by the control line 51 this pulse is directed into the control switch output channel 55 and so ensures by transmission to the right-hand control nozzle of the switch 42b that the condition of this switch remains unaltered. If switch 42a is instead in the sampling condition, the flow to control nozzle 54 is increased to such a degree of inequality in the opposite sense that an applied flow pulse from the control line 51 will be directed into the control switch output channel 56 and by transmission to the left-hand control nozzle of the switch 42b will cause the change of this switch to the sampling condition. The switch 42a is simultaneously changed oppositely and therefore the sampling condition can be propagated stepwise down the switch series.

We claim:

1. A fluid flow arrangement comprising a plurality of bistable fluid switch devices each provided with main fluid flow input means, first and second control flow input means, and first and second fluid flow outlet means to which the main flow can be diverted in response to control fluid flow; means for introducing a main flow of fluid to the main fluid flow input means of each of said fluid switch devices; manifold means for receiving fluid output from a like fluid flow outlet means of each fluid switch device and for conveying said fluid outlet to a common output region; means in said common output region for measuring an intrinsic property of said fluid output; means to convey a portion of the fluid output from a like fluid flow outlet means of each fluid switch device to control flow input means of one other fluid switch device to couple the switch devices in a chain; means connecting a like control flow input means of each fluid switch device to a common control line; and an AND gate for each fluid switch device, the AND gates each having as first input, flow from said common control line, as second input, said portion of the fluid output from the preceding fluid switch device in the chain, and means connecting its output to the first control flow input means of the preceding fluid switch device in the chain as well as to the second control flow input means of its own fluid switch device so that the condition of the two switches is interchanged when the AND gate is operated by a pulse in said common control line.

2. A fluid flow arrangement according to claim 1 wherein said means for measuring an intrinsic property of said fluid output comprises a radiation detector.

3. A fluid flow arrangement according to claim 1 wherein said means for measuring an intrinsic property of said fluid output comprises a thermometer.

4. A fluid flow arrangement according to claim 1 wherein said means for measuring an intrinsic property of said fluid output comprises a flow detector.

5. A fluid flow arrangement according to claim 1 wherein the fluid switch devices are coupled into a ring.

References Cited
UNITED STATES PATENTS

| | | | |
|---|---|---|---|
| 3,276,689 | 10/1966 | Freeman | 137—81.5 X |
| 3,092,819 | 6/1963 | Cochinal | 176—19 LD |
| 3,200,041 | 8/1965 | Ralfe et al. | 176—19 LD |
| 3,161,569 | 12/1964 | Donguy et al. | 176—19 LD |
| 3,116,210 | 12/1963 | Cochinal et al. | 176—19 LD |
| 3,109,929 | 11/1963 | Picard | 176—19 LD |
| 3,128,039 | 4/1964 | Norwood | 235—61 |
| 3,199,782 | 8/1965 | Shinn | 235—201 |
| 3,228,602 | 1/1966 | Boothe | 235—201 |
| 3,285,264 | 11/1966 | Boothe | 137—81.5 |
| 3,340,885 | 9/1967 | Bauer | 137—81.5 |

REUBEN EPSTEIN, Primary Examiner

U.S. Cl. X.R.

137—805, 883; 73—420

UNITED STATES PATENT OFFICE
CERTIFICATE OF CORRECTION

Patent No. 3,806,408　　　　　　　　Dated April 23, 1974

Inventor(s) John Grant and Martin John Fisher

It is certified that error appears in the above-identified patent and that said Letters Patent are hereby corrected as shown below:

In the heading insert

Claims priority of British application Serial No. 58224 filed December 29, 1966

Signed and sealed this 21st day of January 1975.

(SEAL)
Attest:

McCOY M. GIBSON JR.
Attesting Officer

C. MARSHALL DANN
Commissioner of Patents